United States Patent [19]

Vahabzadeh et al.

[11] Patent Number: 5,762,575
[45] Date of Patent: Jun. 9, 1998

[54] LOCK MECHANISM FOR A TRAVELING CHAIN

[75] Inventors: Hamid Vahabzadeh, Oakland; Andrew Leslie Bartos, Clarkston; Norman Kenneth Bucknor, Sterling Heights, all of Mich.

[73] Assignee: General Motors Corporation, Detroit, Mich.

[21] Appl. No.: 810,966

[22] Filed: Feb. 27, 1997

[51] Int. Cl.⁶ .................................................. F16H 59/00
[52] U.S. Cl. ......................... 474/78; 474/80; 474/85
[58] Field of Search ........................ 474/78, 101, 111, 474/80, 81, 84, 85

[56] References Cited

U.S. PATENT DOCUMENTS

| | | | |
|---|---|---|---|
| 5,180,340 | 1/1993 | Vahabzadeh | 474/111 |
| 5,180,341 | 1/1993 | Vahabzadeh et al. | 474/111 |
| 5,201,688 | 4/1993 | Vahabzadeh | 474/111 X |
| 5,234,380 | 8/1993 | Vahabzadeh | 474/78 |
| 5,234,381 | 8/1993 | Vahabzadeh | 474/78 |
| 5,246,406 | 9/1993 | Vahabzadeh | 474/242 |

Primary Examiner—Roger J. Schoeppel
Attorney, Agent, or Firm—Donald F. Scherer

[57] ABSTRACT

A chain drive mechanism has spaced sprockets about which is trained an endless chain. A traveling chain is disposed radially inward of the endless chain and encircles one or the other of the sprockets during power transmission. The traveling chain is transportable between the sprockets so that the speed ratio therebetween can be altered. When encircling a sprocket, the traveling chain is locked or latched to the sprocket. The lock mechanism has a retainer pin and a locking pin. The locking pin is connected for conjoint movement with the retainer pin which is positioned in latched and unlatched positions. In the unlatched position of the retainer pin, the lock pin engages an opening in the link of the traveling chain thereby securing the traveling chain to the sprocket.

2 Claims, 4 Drawing Sheets

1

LOCK MECHANISM FOR A TRAVELING CHAIN

TECHNICAL FIELD

This invention relates to traveling chain mechanisms and devices for locking the traveling chain to a sprocket.

BACKGROUND OF THE INVENTION

Traveling chain mechanisms, such as those shown in U.S. Pat. No. 5,180,341, issued Jan. 19, 1993, and assigned to the assignee of the present invention, have a latching mechanism consisting of a pin member on each link of the traveling chain and a pair of resilient disc members having apertured segments into which the pins are positioned. This locks the traveling chain to the respective sprocket. To release the traveling chain, the segments are deflected axially thereby releasing the pins such that centrifugal action and ejectors will direct the chain from one sprocket for transport to the other sprocket.

SUMMARY OF THE INVENTION

It is an object of the present invention to provide an improved locking mechanism for a traveling chain.

In one aspect of the invention, a locking mechanism provides for the securement of each link on the traveling chain to the sprocket with which it is engaged. The locking mechanism has a plurality of lock pins, one for each sprocket tooth, which will selectively engage a locking tab on each link. The locking mechanism also provides for the selective release of the links. A plurality of retainer pins are provided along with a retainer plate for each retainer pin. Each retainer pin controls or establishes the locked or unlocked condition of two adjacent locking pins. The retainer plate holds the retainer pin, against a spring load, in a latched position such that the locking pins will not engage the locking tab. When the traveling chain engages the sprocket, the locking tab is brought into abutment with the retainer plate forcing it radially inward whereby the retainer pin is unlatched thereby permitting the lock pins to engage the incoming locking tab.

DESCRIPTION OF AN EXEMPLARY EMBODIMENT

Figure 6:
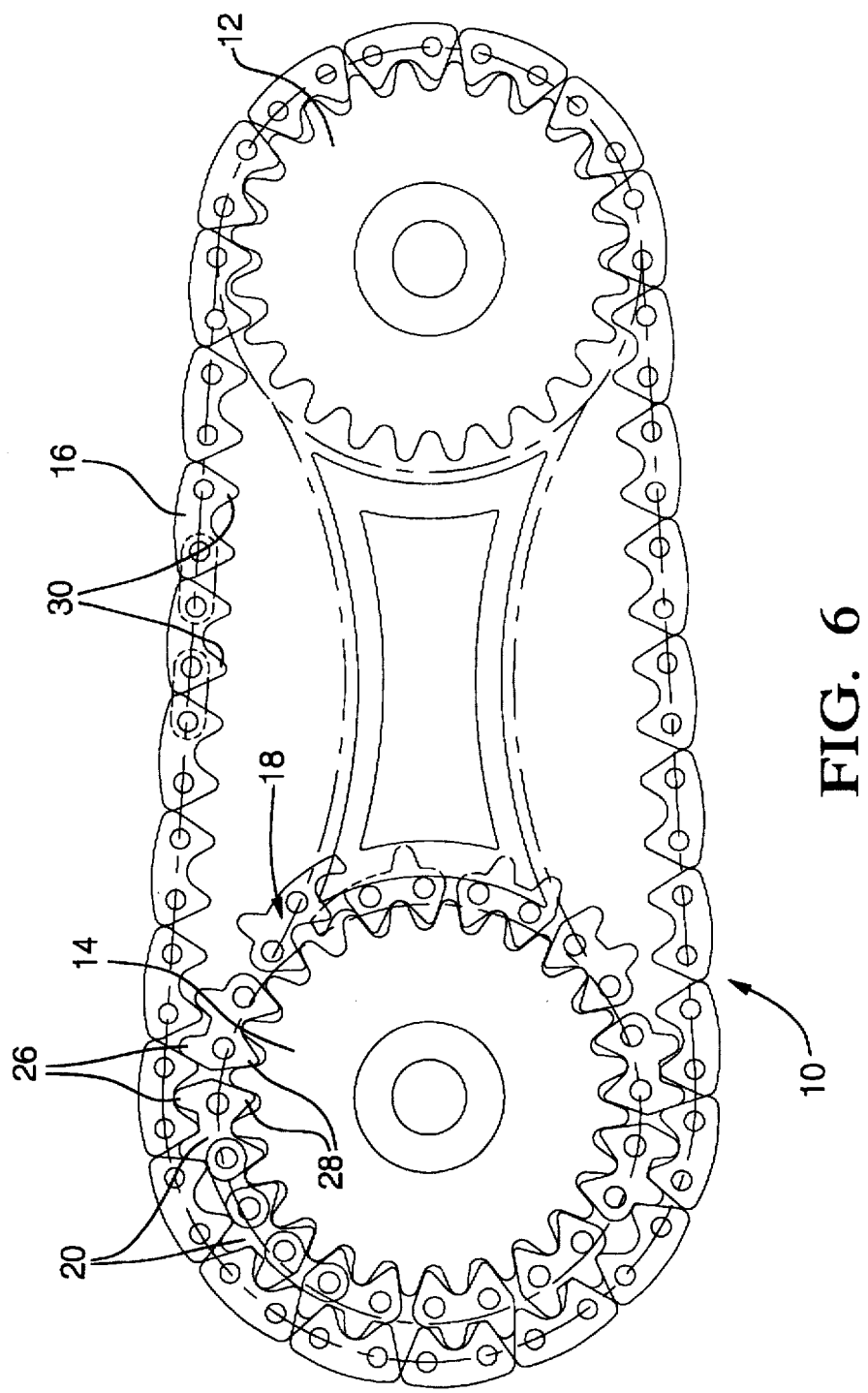
FIG. 6 is a side elevational view of a chain drive mechanism with a traveling chain.

Referring to the drawings, wherein like characters represent the same or corresponding parts throughout the several views, there is seen particularly in FIG. 6, a chain drive mechanism 10 having a pair of spaced sprockets 12 and 14 about which is trained an endless drive chain 16. Also entrained or encircling the sprocket 14 is a traveling chain 18.

The traveling chain 18 forms a diametral value for the sprocket 14 such that the sprocket 14 has a larger diametral value than the sprocket 12. Thus, the sprocket 14 will travel or rotate less rapidly than the sprocket 12. The ratio between the sprockets 12 and 14 can be changed by releasing the traveling chain 18 from the sprocket 14 for transport to the sprocket 12. Once the sprocket 12 is encircled, the ratio between the sprockets 12 and 14 will be changed such that the sprocket 14 will rotate faster than the sprocket 12.

A more complete description of the traveling chain mechanism can be found in U.S. Pat. No. 5,180,341.

Figure 5:
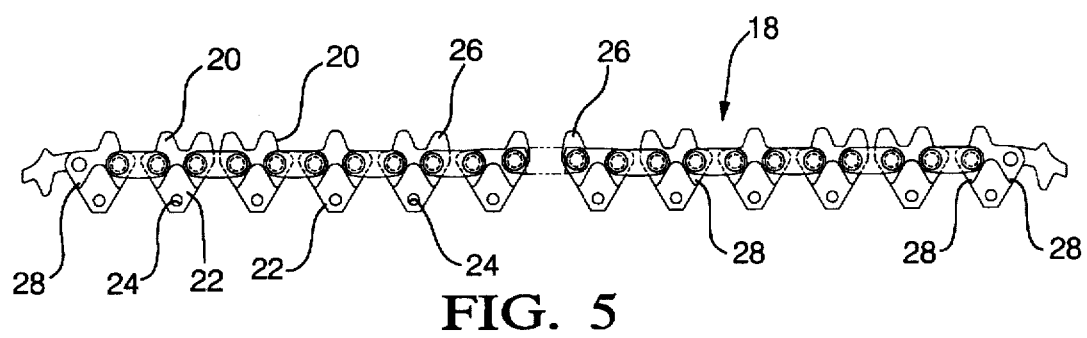
FIG. 5 is a side elevational view of a traveling chain.

An elevational view of the traveling chain is shown in FIG. 5. As can be seen there, the traveling chain has a plurality of links 20 each of which has secured therewith a lock tab or plate 22. Each lock tab 22 has an aperture 24. Each link 20 has external teeth 26 and internal teeth 28.

Figure 2:
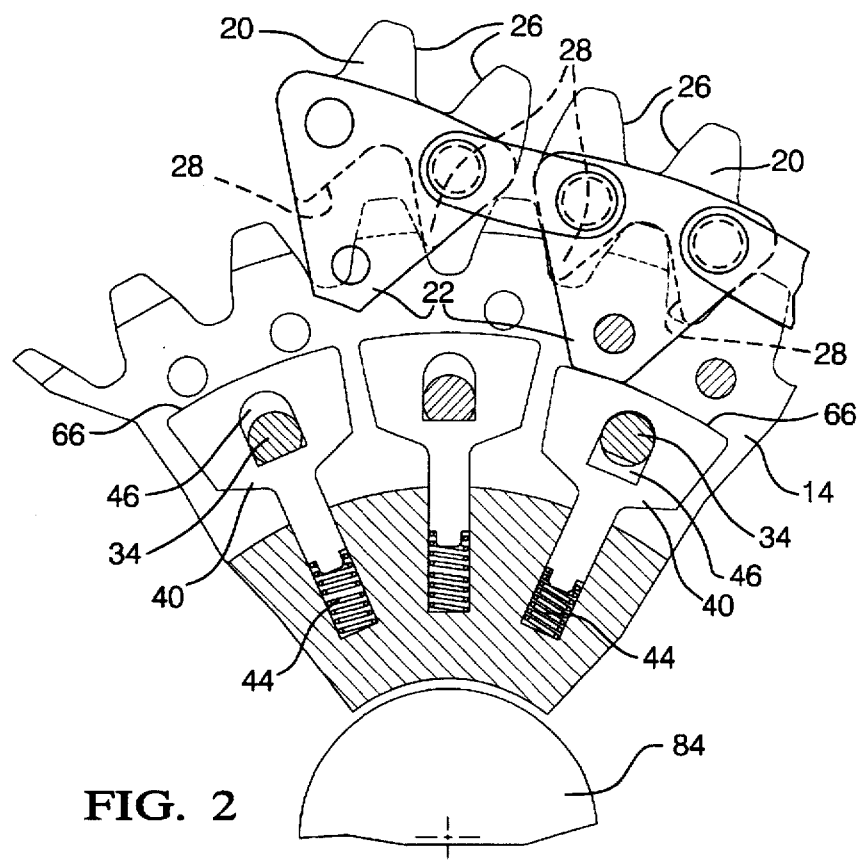
FIG. 2 is a view taken along line 2—2 of FIG. 1.

The internal teeth 28 engage the respective sprocket 12 or 14 while the external teeth are disposed in engagement with teeth 30 formed on the endless chain 16. The engagement of the traveling chain 18 with the sprocket 14 can be partially seen in FIG. 2.

In FIGS. 1 through 4, a locking mechanism 32 for the traveling chain 18 is described. The locking mechanism 32 includes a plurality of retainer pins 34, a plurality of lock pins 36, a plurality of finger plates 38, and a plurality of retainer plates 40. Each retainer plate 40 is urged radially outward in a slot 42 formed in the sprocket 14 by a retainer or release spring 44.

Figure 1:
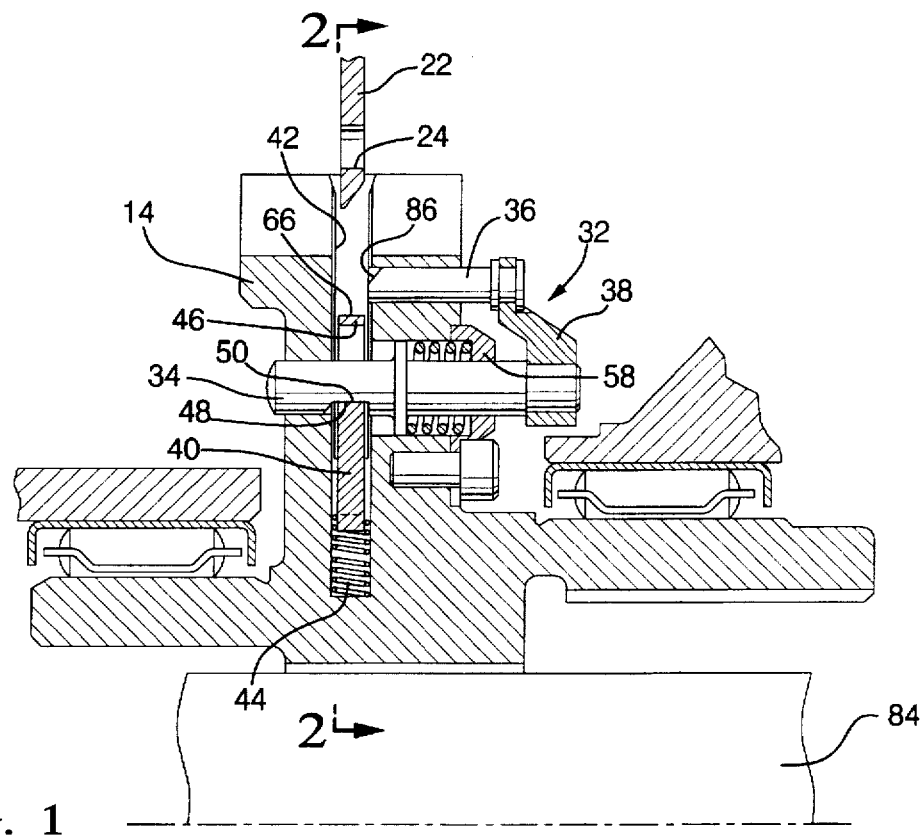
FIG. 1 is a sectional elevational view of a chain lock mechanism incorporating the present invention and showing an unlocked condition.

Each retainer plate 40 has formed therein an aperture or opening 46 in which the retainer pin 34 is partially disposed. Each retainer pin 34 has formed therein a notch 48 which, as seen in FIG. 1, can engage the lower or bottom surface 50 of the aperture 46, and in FIG. 3, the retainer pin 34 extends through the aperture 46. The retainer pin 34 has formed thereon a shoulder 52 against which a spring 54 is compressed in abutment. The spring is positioned in a pocket 56 formed in the sprocket 14 and reacted upon by a cap 58. The spring 54 continuously exerts a leftward force on the retainer pin 34 such that when the notch 48 is cleared of the bottom 50 of the aperture 46, the retainer pin will be moved leftward under the force of the spring 54.

Figure 4:
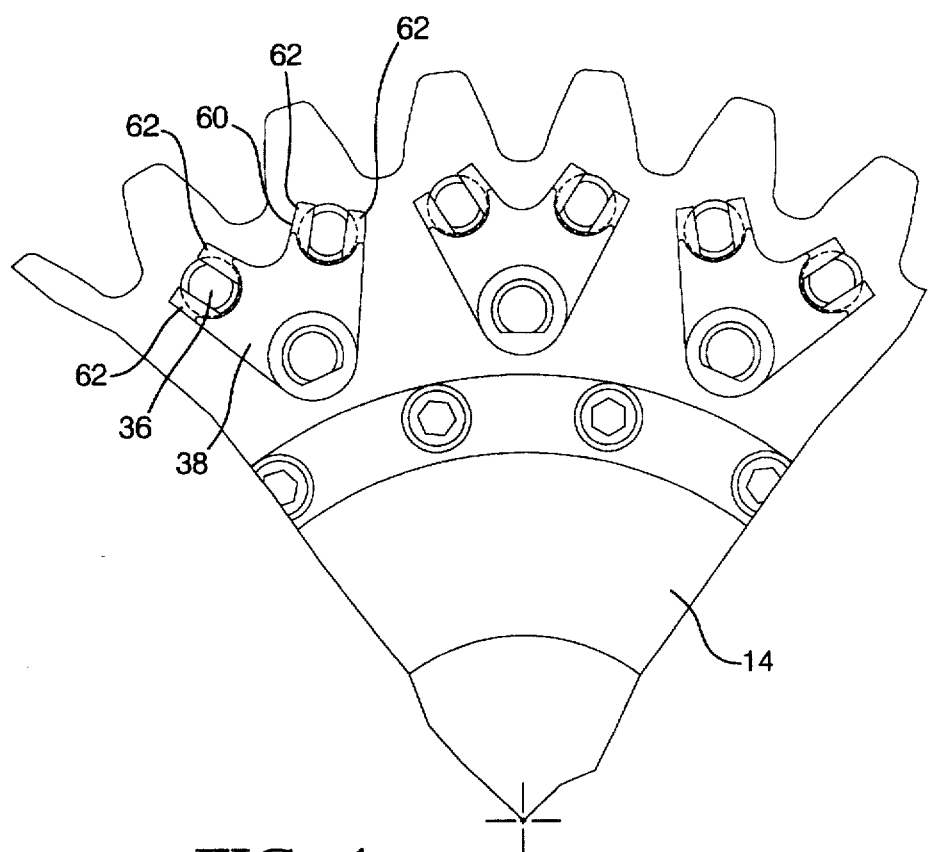
FIG. 4 is a side elevational view of a sprocket incorporating the present invention.

The finger plate 38, as best seen in FIG. 4, is bifurcated into fingers 60, each of which is further bifurcated into sub-fingers 62. The subfingers 62 engage a collar or yoke 64 formed on each locking pin 36. The finger plate 38 is secured for conjoint movement with the retainer pin 34 and the lock pins 36 are restrained for conjoint movement with the finger plate 38 such that the retainer pins 34 control movement of the lock pins 36.

Figure 3:
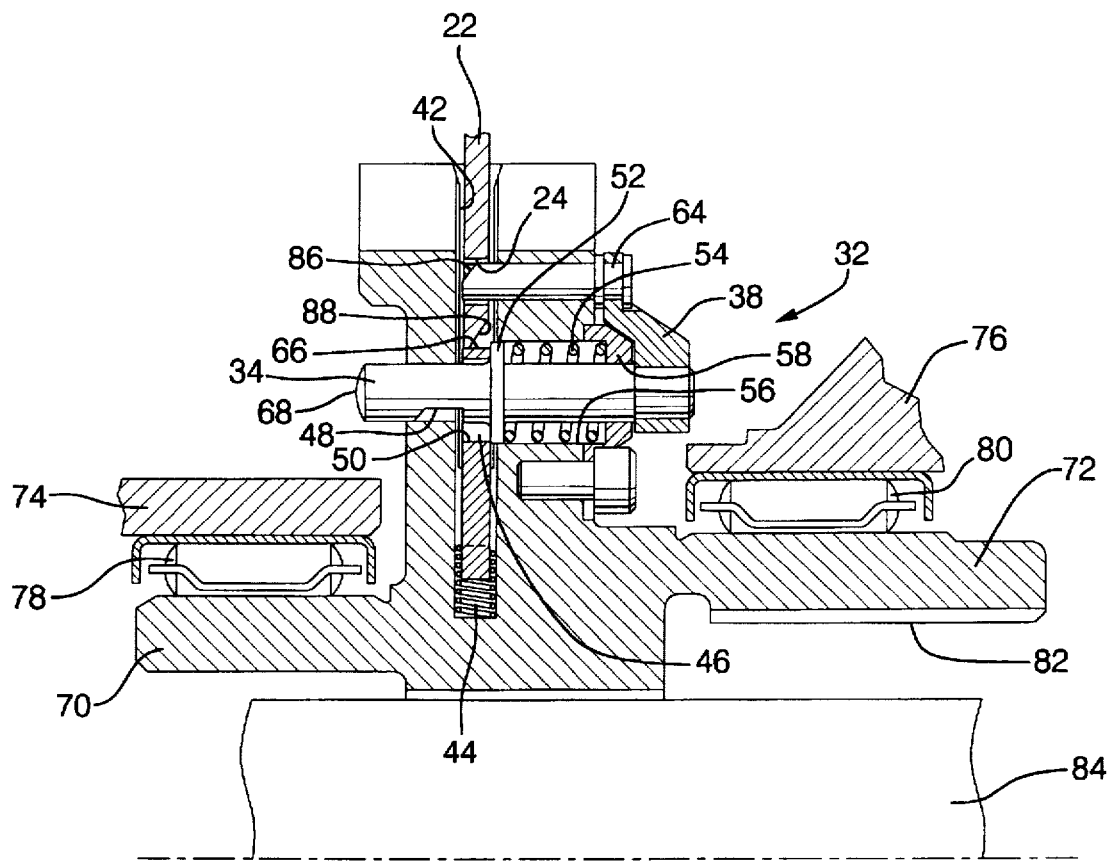
FIG. 3 is a view similar to FIG. 1 showing the lock mechanism in a locked condition.

As seen in FIG. 1, the retainer plate 40 is extending radially outward and engaged in the notch 48. The lock tab 22 of the traveling chain 18 is shown entering the slot 42. Upon entering the slot 42, as shown in FIG. 1, being fully engaged in the slot 42, as shown in FIG. 3, the lock tab 22 will engage an outer surface 66 of the retainer plate 40 thereby forcing the retainer plate 40 radially inward against the spring 44. As the retainer plate 40 moves radially inward, the lower surface 50 will release the notch 48 such that the spring 54 can move the retainer pin leftward carrying with it the lock pin 36. The lock pin 36 will engage in the aperture 24 of the lock tab 22, thereby securing the traveling chain 18 with the sprocket 14.

To release the traveling chain 18 from the sprocket 14 for transport to the sprocket 12, an actuator (not shown) can be provided to abut an outer surface or end 68 of the retainer pin 34. The actuator can incorporate a cam surface which will cause the pin 34 to be moved rightward against the force of spring 54 such that the lock pin 36 will be withdrawn from the aperture 24 and the spring 44 can induce outward movement of the lock tab 22.

Also, if desired, a positive derailment mechanism can be provided for the traveling chain 18. One such derailing mechanism is shown in co-pending U.S. patent application Ser. No. 08/810,968 filed Feb. 27, 1997, (Attorney Docket H-197618) and assigned to the assignee of the present invention.

The sprocket 14 has a pair of spaced shoulders 70 and 72 which are supported in housings 74 and 76, respectively, by bearings 78 and 80. The shoulder 72 has formed thereon a spline 82 which can be meshed or mated with a shaft, not shown. The shaft engaging the spline 82 can be either the input or output shaft for the drive mechanism. In the alternative, the sprocket 14 can be engaged with a shaft, such as 84, for drive connection between an input or output mechanism.

The structure of the sprocket 12 is preferably identical to the structure of sprocket 14, since these sprockets will be of the same diameter such that the traveling chain will provide one encirclement at the sprocket about which it is entrained. The particular structure utilized to actuate the retainer pin 34 is immaterial to the present invention. However, as stated above, at least one possible is shown in the above cited U.S. co-pending patent application.

What should be noted and appreciated, is that when the retainer pin 34 is in the latched position and held there by the retainer plate 40, the lock pins 36 are in the unlocked position. Likewise, when the retainer pin is unlatched, the lock pins 36 can move to the locking condition, as shown in FIG. 3. It should also be noted that each lock pin 36 has a beveled edge 86 which can be engaged by a beveled edge 88 formed on each lock tab 22. Therefore, if the retainer pin 34 has, for some reason, not returned to the unlatched position shown in FIG. 2, the lock tab 22 can, upon engagement between the surfaces 88 and 86, force the lock pin 36 and therefore the retainer pin 34 rightward until the lock tab 22 is fully engaged into the slot 42 and the inner teeth 28 of the traveling chain 18 are meshed with the teeth on the sprocket.

Thus, there is above described a locking mechanism which will selectively secure a traveling chain to a drive or driven sprocket in a traveling chain drive mechanism.

We claim:

1. A traveling chain locking mechanism comprising:
   a traveling chain having a plurality of links, at least one of said links having a locking tab with an aperture formed therein;
   a sprocket having a plurality of teeth engageable with respective ones of said links; and
   a locking mechanism disposed on said sprocket comprising:
      a retainer pin slidably disposed in a bore in said sprocket and having a notch formed thereon;
      a spring disposed in said bore and urging said retainer pin to a locking position;
      a finger plate secured for conjoint movement with said retainer pin and having a bifurcated portion forming two fingers;
      a lock pin slidably disposed in another bore in said sprocket and having a collar portion engaged between said fingers, said lock pin being moveable with corresponding movement of said retainer pin for engagement with said aperture in said locking position;
      a retainer plate, having a locked position and a spring set position, including an aperture surrounding a portion of said retainer pin and being engageable with said notch when said retainer plate is in said spring set position to retain said retainer pin and said lock pin is in an unlocked position; and
      said locking tab being engageable with said retainer plate to urge said retainer plate from said spring set position to said locking position thereby permitting said retainer pin and said lock pin to move to said locking position with said lock pin engaging in said aperture in said locking tab.

2. A traveling chain locking mechanism comprising:
   a traveling chain having a plurality of links, a plurality of said links each having a locking tab with an aperture formed therein;
   a sprocket having a plurality of teeth with spaces therebetween and being engageable with respective ones of said links; and
   a locking mechanism disposed on said sprocket comprising;
   a plurality of retainer pins slidably disposed in respective bores in said sprocket substantially aligned with a center of respective ones of the spaces between alternate teeth and having a notch formed thereon;
   a spring disposed in each said bore for urging said retainer pins to a locking position;
   a plurality of finger plates secured for conjoint movement with adjacent pairs of said retainer pins and having a pair of bifurcated portions each forming two fingers;
   lock pins slidably disposed in respective axial bores in said sprocket substantially aligned with a center of respective teeth and each lock pin having a collar portion engaged between respective ones of said fingers, said lock pins being moveable with corresponding movement of said respective finger plates and said retainer pins for engagement with respective ones of said apertures of said locking tabs to thereby attain said locking position;
   a plurality of retainer plates each having a locked position and a spring set position and each including an aperture surrounding a portion of respective retainer pins and being engageable with respective notches when each said retainer plate is in said spring set position to retain each said retainer pin and said lock pin is in an unlocked position; and
   each said locking tab being engageable with respective retainer plates to urge said retainer plates from said spring set position to said locked position thereby permitting said retainer pin and said lock pin to move to said locking position with said lock pin engaging in said aperture in said locking tab.

* * * * *